United States Patent
Kojima et al.

(10) Patent No.: US 11,338,407 B2
(45) Date of Patent: May 24, 2022

(54) ERROR MEASUREMENT METHOD FOR MACHINE TOOL AND MACHINE TOOL

(71) Applicant: OKUMA CORPORATION, Niwa-Gun (JP)

(72) Inventors: Takuya Kojima, Niwa-Gun (JP); Tetsuya Matsushita, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 86 days.

(21) Appl. No.: 17/079,646

(22) Filed: Oct. 26, 2020

(65) Prior Publication Data

US 2021/0154791 A1 May 27, 2021

(30) Foreign Application Priority Data

Nov. 25, 2019 (JP) .............................. JP2019-212622

(51) Int. Cl.
*B23Q 15/24* (2006.01)
*B23Q 17/22* (2006.01)

(52) U.S. Cl.
CPC ......... *B23Q 17/2233* (2013.01); *B23Q 15/24* (2013.01); *B23Q 2717/00* (2013.01)

(58) Field of Classification Search
None
See application file for complete search history.

(56) References Cited

U.S. PATENT DOCUMENTS

2019/0084112 A1* 3/2019 Kojima .............. B23Q 17/2275
2019/0187660 A1* 6/2019 Yanaka .............. G01B 9/02071

FOREIGN PATENT DOCUMENTS

JP H06-138921 A1 5/1994
JP 2012-030338 A1 2/2012

* cited by examiner

*Primary Examiner* — Ryan A Jarrett
(74) *Attorney, Agent, or Firm* — Burr & Brown, PLLC

(57) ABSTRACT

An error measurement method for a machine tool measures an error in a machine tool that includes two or more translational axes, a table, and a spindle head. The error measurement method includes installing a masterwork having a plurality of targets on the table and detecting a position of each of the targets using a sensor mounted to the spindle head to acquire a measured value regarding the position of each of the targets and to acquire an error value regarding the position of each of the targets using each of the acquired measured values and a preliminarily acquired calibration value regarding the position of each of the targets. The error measurement method further includes calculating at least one disturbance index value indicative of a degree of disturbance in the measurement for each of the targets, and determining whether the disturbance index value exceeds a preliminarily set threshold.

9 Claims, 4 Drawing Sheets

ERROR MEASUREMENT METHOD FOR MACHINE TOOL AND MACHINE TOOL

BACKGROUND OF THE INVENTION

This application claims the benefit of Japanese Patent Application Number 2019-212622 filed on Nov. 25, 2019, the entirety of which is incorporated by reference.

TECHNICAL FIELD OF THE INVENTION

The disclosure relates to a method for measuring an error in a machine tool and the machine tool configured to perform the method.

DESCRIPTION OF RELATED ART

FIG. 1 is a schematic diagram of a numerical control machine tool (machining center) having three translational axes.

A spindle head 2 is allowed to perform a motion of two degrees of translational freedom in an X-axis and a Z-axis, which are the translational axes and are orthogonal to one another. A table 3 is allowed to perform a motion of one degree of translational freedom in a Y-axis, which is the translational axis and orthogonal to the X-axis and the Z-axis. Accordingly, the spindle head 2 has three degrees of translational freedom with respect to the table 3. Servomotors, which are controlled by a numerical control device, drive respective axes. A workpiece is fixed to the table 3, a tool is installed to a main spindle 2a of the spindle head 2 and rotated, thus machining the workpiece in any shape.

As a motion accuracy in the machine tool, a positioning accuracy, a straightness, and the like are included. The motion accuracies are transferred to a shape of the workpiece and cause shape and dimensional errors of the workpiece. In contrast, a compensation control using the positioning accuracy and the straightness as parameters ensures a machining with high accuracy.

For example, Japanese Unexamined Patent Application Publication No. H6-138921 provides a method that measures a position of a target on a masterwork with a touch probe, calculates a compensation parameter for an error of a linear interpolation feeding based on a deviation between the measurement result and a calibration value, and performs a compensation control based on the calculated compensation parameter.

However, in the method, a plane of the masterwork is set as the measurement target, and the plane does not have a predetermined length, such as diameter of a sphere or a hole. Accordingly, lengths of predetermined parts of the target cannot be measured, and a measurement error cannot be determined based on a variation of errors between the measured values and the calibration values.

In contrast, the applicant of the present disclosure provides the following disclosure in Japanese Unexamined Patent Application Publication No. 2012-30338. A shape of a target on a masterwork is a sphere, lengths of predetermined parts of the sphere are measured, a variation of errors between the measured values and calibration values is calculated, and a measurement error is determined when the variation exceeds a predetermined value.

However, when the position of the target on the masterwork is measured with the touch probe, due to an influence of, for example, a foreign matter attached to the masterwork, there may be a case where disturbance is input to the measurement result and an accurate measurement result cannot be obtained. When the compensation control is performed with the compensation parameter calculated based on such measurement result, processing accuracy is degraded on the contrary in some cases.

Therefore, an object of the disclosure is to provide an error measurement method for a machine tool and a machine tool that automatically sense disturbance from a measurement result regardless of a shape of a target and obtain an accurate measurement result.

SUMMARY OF THE INVENTION

In order to achieve the above-described object, an error measurement method for a machine tool according to a first aspect of the disclosure is provided for measuring an error in a machine tool. The machine tool includes two or more translational axes, a table configured to hold a workpiece, and a spindle head configured to hold a tool. The translational axes enable a relative motion of two degrees or more of translational freedom of the tool held onto the spindle head with respect to the workpiece. The error measurement method includes an error value acquisition step, a disturbance index value calculation step, and a threshold determination step. The error value acquisition step is a step of installing a masterwork having a plurality of targets on the table and detecting a position of each of the targets using a sensor mounted to the spindle head to acquire a measured value regarding the position of each of the targets and to acquire an error value regarding the position of each of the targets using each of the acquired measured values and a preliminarily acquired calibration value regarding the position of each of the targets. The disturbance index value calculation step is a step of calculating at least one disturbance index value indicative of a degree of disturbance in the measurement for each of the targets. The threshold determination step is a step of determining whether the disturbance index value exceeds a preliminarily set threshold.

In order to achieve the above-described object, an error measurement method for a machine tool according to a second aspect of the disclosure is provided for measuring an error in a machine tool. The machine tool includes two or more translational axes, one or more rotation axes or a translational axis different from the translational axes, a table configured to hold a workpiece, and a spindle head configured to hold a tool. The two or more translational axes enable a relative motion of two degrees or more of translational freedom of the tool held onto the spindle head with respect to the workpiece. The error measurement method includes an error value acquisition step, a disturbance index value calculation step, and a threshold determination step. The error value acquisition step is a step of installing a target on the table, positioning the two or more translational axes and the rotation axis or the different translational axis under a plurality of conditions, and detecting a position of the target using a sensor mounted to the spindle head to acquire a measured value regarding the position of the target for each of the positioning conditions and to acquire an error value regarding the position of the target based on each of the acquired measured values. The disturbance index value calculation step is a step of calculating at least one disturbance index value indicative of a degree of disturbance in the measurement for each of the positioning conditions. The threshold determination step is a step of determining whether the disturbance index value exceeds a preliminarily set threshold.

In the above-described configuration, the disclosure of a third aspect further includes calculating at least one of the disturbance index values based on a plurality of the error values and a window function.

In the above-described configuration, the disclosure of a fourth aspect further includes calculating at least one of the disturbance index values based on a difference between the one error value and a value obtained by smoothing the plurality of error values by the window function.

In the disclosure of a fifth aspect in the above-described configuration, in the threshold determination step, when the at least one disturbance index value exceeds the threshold, the error value acquisition step is performed again on the target or the positioning condition where the error value has already been acquired.

In the disclosure of a sixth aspect in the above-described configuration, when a count of performing the error value acquisition step on the target or the positioning condition exceeds a predetermined count, the error value acquisition step is not performed again.

In the disclosure of a seventh aspect in the above-described configuration, in the threshold determination step, when the at least one disturbance index value exceeds the threshold, its situation is notified.

In order to achieve the above-described object, a machine tool according to an eighth aspect of the disclosure is provided. The machine tool includes two or more translational axes, a table configured to hold a workpiece, and a spindle head configured to hold a tool. The translational axes enable a relative motion of two degrees or more of translational freedom of the tool held onto the spindle head with respect to the workpiece. The machine tool includes an error value acquisition unit, a disturbance index value calculation unit, and a threshold determination unit. The error value acquisition unit is configured to detect a position of each target using a sensor mounted to the spindle head in a state where a masterwork having a plurality of the targets is installed on the table to acquire a measured value regarding the position of each of the targets and to acquire an error value regarding the position of each of the targets using each of the acquired measured values and a preliminarily acquired calibration value regarding the position of each of the targets. The disturbance index value calculation unit is configured to calculate at least one disturbance index value indicative of a degree of disturbance in the measurement for each of the targets. The threshold determination unit is configured to determine whether the disturbance index value exceeds a preliminarily set threshold.

In order to achieve the above-described object, a machine tool according to a ninth aspect of the disclosure is provided. The machine tool includes two or more translational axes, one or more rotation axes or a translational axis different from the translational axes, a table configured to hold a workpiece, and a spindle head configured to hold a tool. The two or more translational axes enable a relative motion of two degrees or more of translational freedom of the tool held onto the spindle head with respect to the workpiece. The machine tool includes an error value acquisition unit, a disturbance index value calculation unit, and a threshold determination unit. The error value acquisition unit is configured to position the two or more translational axes and the rotation axis or the different translational axis under a plurality of conditions in a state where a target is installed on the table and detect a position of the target using a sensor mounted to the spindle head to acquire a measured value regarding the position of the target for each of the positioning conditions and to acquire an error value regarding the position of the target based on each of the acquired measured values. The disturbance index value calculation unit is configured to calculate at least one disturbance index value indicative of a degree of disturbance in the measurement for each of the positioning conditions. The threshold determination unit is configured to determine whether the disturbance index value exceeds a preliminarily set threshold.

The disclosure allows automatically sensing the measurement result of the large disturbance regardless of the shape of the target of the masterwork and performing the measurement again or halting the measurement. Accordingly, the accurate measurement result can be obtained and the deterioration of the processing accuracy can be reduced.

DETAILED DESCRIPTION OF THE INVENTION

The following describes embodiments of the disclosure based on the drawings.

Figure 1:
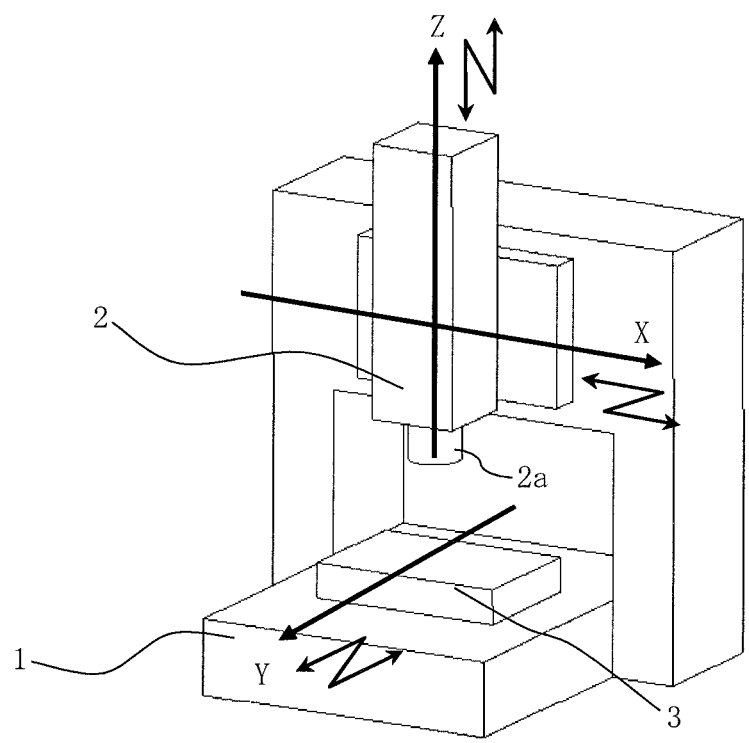
FIG. 1 is a schematic diagram of a numerical control machine tool.

A numerical control machine tool of FIG. 1 will be described as an example of an applied machine. However, the machine related to the disclosure may be another machine tool, such as a multitasking machine, a lathe, and a grinder.

Figure 2:
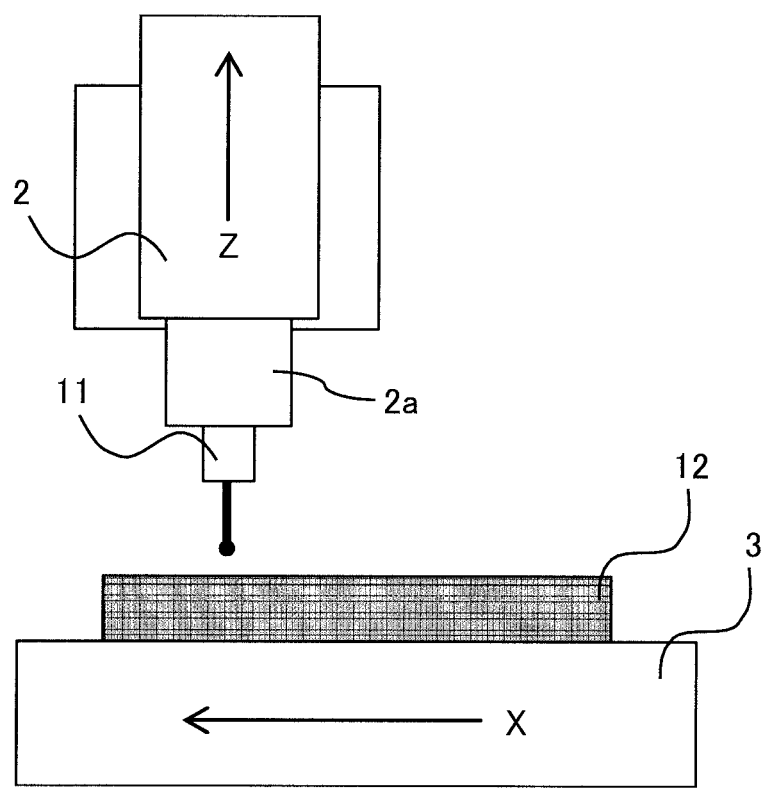
FIG. 2 is a schematic diagram of a probe and a masterwork installed on a table.

In the disclosure, as illustrated in FIG. 2, a touch probe 11 is mounted to a main spindle 2a of a spindle head 2, a masterwork 12 as a measurement object is fixed to a table 3, and a position of a target on the masterwork 12 is measured with the touch probe 11. FIG. 2 is an example in which the target on a plane of the masterwork 12 is measured and Z-direction component straightness of an X-axis is measured. The disclosure can be embodied to a case where straightness and positioning accuracy of another axis and another component are measured. Here, a numerical control device disposed in a machine tool functions as an error value acquisition unit, a disturbance index value calculation unit, and a threshold determination unit of the disclosure.

Figure 3:
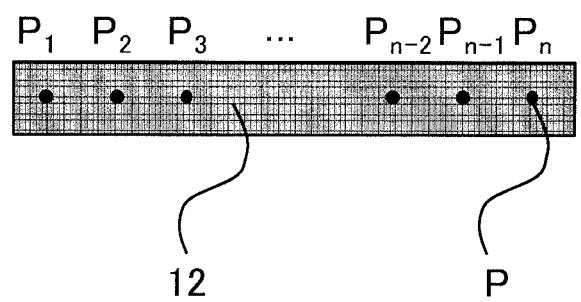
FIG. 3 is a schematic diagram of the masterwork.

As illustrated in FIG. 3, a plurality of targets P ($P_1$, $P_2$, $P_3$ ... $P_{n-2}$, $P_{n-1}$, $P_n$) are present on the masterwork 12.

Relative positions of the targets $P_1$ to $P_n$ are measured by a highly accurate measuring device or the like in advance, and the measurement results are recorded as calibration values. While FIG. 3 illustrates an example in which the target P is a point on the plane a sphere may be attached or a hole may be bored as long as the relative position is recorded.

Figure 4:
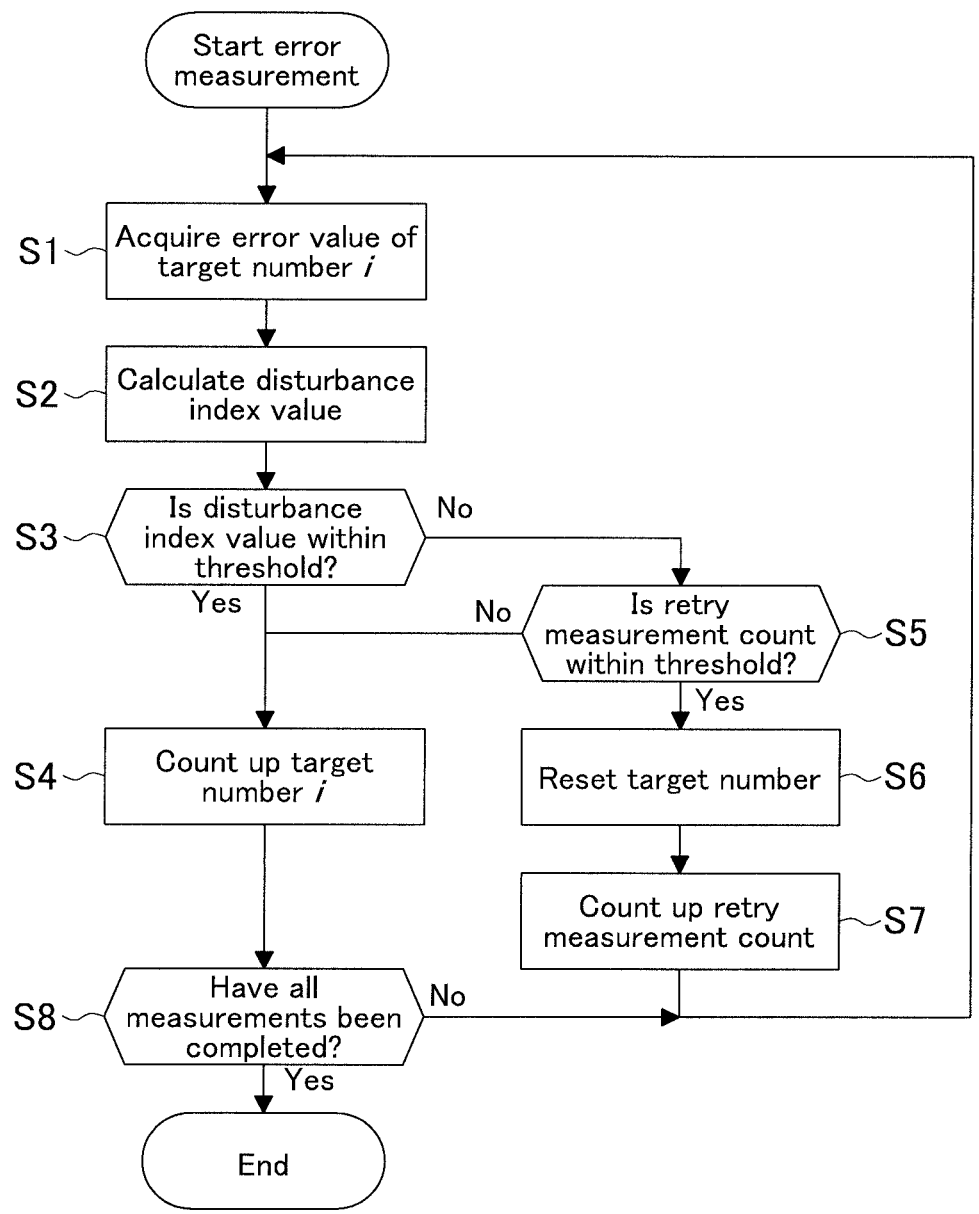
FIG. 4 is a flowchart for an error measurement method of the disclosure.

Subsequently, an error measurement method of the disclosure will be described based on the flowchart of FIG. 4.

First, the position of the target $P_i$, which is the target P with a target number i, is measured with the touch probe 11. A difference between a measured value $Zm_i$ obtained through the measurement and a calibration value $Zc_i$ recorded in advance is obtained to acquire an error value $\Delta Z_i = Zm_i - Zc_i$ (S1: error value acquisition step).

A disturbance index value is calculated for the obtained error value $\Delta Z_i$ (S2: disturbance index value calculation step). To calculate the disturbance index value of the i-k-th target P, the error values of the i-th target P from the i-2k-th target P are used. Accordingly, after acquiring the error value of the i-th target P, the disturbance index value of the i-k-th target P is calculated.

In comparison with the error values around the error value $\Delta Z_i$, the error value $\Delta Z_i$ does not rapidly change. On the other hand, when disturbance is included in the error value $\Delta Z_i$ the error value $\Delta Z_i$ rapidly changes due to the disturbance. Thus, by the use of a window function, a change component $d_{i-k}$ of the error value is calculated, and a disturbance index value $D_{i-k}$ is calculated based on the change component $d_{i-k}$ of the error value.

The change component $d_{i-k}$ of the error value is calculated by multiplying $\Delta Z_{i-2k}$ to $\Delta Z_i$ by window functions $w_{i-2k}$ to $w_i$ and summing the values as in the following Math. 1.

$$d_{i-k} = w_{i-2k} * \Delta Z_{i-2k} + w_{i-2k+1} * \Delta Z_{i-2k+1} + \ldots + w_{i-2} * \Delta Z_{i-2} + w_{i-1} * \Delta Z_{i-1} + w_i * \Delta Z_i \quad \text{[Math. 1]}$$

An example of the window function $w_i$ will be described. Here, the case of k=2 will be described. The error values $\Delta Z_{i-4}$ to $\Delta Z_i$ of the i-4-th to the i-th targets P as the targets are smoothed, and a smoothed error $\Delta Z_{Si-2}$ of the i-2-th target P is obtained. For example, with the use of a Savitzky-Golay filter as a smoothing filter, the error value $\Delta Z_{Si-2}$ after the smoothing can be expressed like the following Math. 2.

$$\Delta Z_{Si-2} = (-3 * \Delta Z_{i-4} + 12 * \Delta Z_{i-3} + 17 * \Delta Z_{i-2} + 12 * \Delta Z_{i-1} - 3 * \Delta Z_i)/35 \quad \text{[Math. 2]}$$

The change component $d_{i-2}$ of the error value can be calculated by subtracting the error value $\Delta Z_{Si-2}$ after the smoothing from the error value $\Delta Z_{i-2}$ as in the following Math. 3.

$$d_{i-2} = \Delta Z_{i-2} - Z_{Si-2} = (3 * \Delta Z_{i-4} - 12 * \Delta Z_{i-3} + 18 * Z_{i-2} - 12 * \Delta Z_{i-1} + 3 * \Delta Z_i)/35 \quad \text{[Math. 3]}$$

Subsequently, a calculation method of the disturbance index value $D_{i-k}$ will be described. The disturbance index value $D_{i-k}$ is calculated by obtaining an absolute value of the change component $d_{i-k}$ of the error value. Alternatively, as shown in the following Math. 4, the disturbance index value $D_{i-k}$ may be calculated by obtaining a difference between the maximum value and the minimum value of the change components $d_{k+1}$ to $d_{i-k}$ of the error values from the k+1-th to the i-k-th targets P.

$$D_{i-k} = \max\{d_{k+1}, \ldots, d_{i-k}\} - \min\{d_{k+1}, \ldots, d_{i-k}\} \quad \text{[Math. 4]}$$

Next, it is determined at S3 whether the calculated disturbance index value $D_{i-k}$ is within a threshold $D_{th}$ (threshold determination step). When the disturbance index value $D_{i-k}$ is within the threshold ($D_{i-k} \leq D_{th}$) in the determination, the target number i is counted up at S4, and the process transitions to the next, which is the measurement of the target P. On the other hand, when the disturbance index value $D_{i-k}$ is larger than the threshold ($D_{i-k} > D_{th}$), determination on a retry measurement count $N_{i-k}$ for the same target is performed at S5.

When the retry measurement count $N_{i-k}$ is within the retry threshold $N_{th}$, the target number i is reset to i-k at S6, the retry measurement count $N_{i-k}$ is counted up at S7, and the process returns to S1 to acquire the error value of the target $P_{i-k}$ again. On the other hand, when the retry measurement count exceeds the retry threshold at S5, the retry is not performed, the target number i is counted up at S4, and the process transitions to the next, which is the measurement of the target P. Then, the measurement may be halted and the fact may be notified without transition to the next, which is the measurement of the target P.

Finally, it is determined at S8 whether the measurements of all of the targets P have been completed, and the measurement is terminated when completed.

After the termination of the measurement, the compensation parameter is calculated using only the error values of the targets P having the disturbance index values within the threshold, and the numerical control device compensates the respective control parameters based on the calculated compensation parameter.

As described above, the error measurement method and the numerical control machine tool of the configurations perform the error value acquisition step, the disturbance index value calculation step, and the threshold determination step. The error value acquisition step is a step of installing the masterwork 12 having the plurality of targets P on the table 3 and detecting the position of each target P using the touch probe 11 (sensor) mounted to the spindle head 2 to acquire each measured value of the position of each target P and to acquire the error value related to the position of each target P using each acquired measured value and the preliminarily acquired calibration value related to the position of each target P. The disturbance index value calculation step is a step of calculating at least one disturbance index value indicative of the degree of the disturbance in the measurement for each target P. The threshold determination step is a step of determining whether the disturbance index value exceeds the preliminarily set threshold.

The configuration allows automatically sensing the measurement result with the large disturbance regardless of the shape of the target P of the masterwork 12 and performing the measurement again or halting the measurement. Accordingly, the accurate measurement result can be obtained, and the deterioration of the processing accuracy can be reduced.

In the configuration, when the disturbance index value exceeds the threshold in the determination at S3, the retry (re-acquisition of the error value and calculation of the disturbance index value) is performed by the retry measurement count within the retry threshold. However, when the disturbance index value exceeds the threshold, the re-acquisition of the error value may be halted without performing the retry, and the fact may be notified.

In the configuration, the positions of the plurality of targets are measured and the respective error values to the calibration values are acquired to calculate the disturbance index values. The disclosure is applicable to a machine tool having one or more rotation axis or another redundant translational axis, in addition to the two or more translational axes. In this case, it is only necessary to install one target on the table, position the rotation axis and the translational axis under a plurality of conditions, measure the position of the target for each positioning condition, and acquire the plurality of error values under each positioning condition similarly to the above-described configuration.

In this case as well, the accurate measurement result can be obtained by calculating the disturbance index value under each positioning condition and comparing the disturbance index value with the threshold.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An error measurement method for a machine tool for measuring an error in a machine tool, wherein
the machine tool includes two or more translational axes, a table configured to hold a workpiece, and a spindle head configured to hold a tool, the translational axes enable a relative motion of two degrees or more of translational freedom of the tool held onto the spindle head with respect to the workpiece,
the error measurement method comprising:
installing a masterwork having a plurality of targets on the table and detecting a position of each of the targets using a sensor mounted to the spindle head to acquire a measured value regarding the position of each of the targets and to acquire an error value regarding the position of each of the targets using each of the acquired measured values and a preliminarily acquired calibration value regarding the position of each of the targets;
calculating at least one disturbance index value indicative of a degree of disturbance in the measurement for each of the targets; and
determining whether the disturbance index value exceeds a preliminarily set threshold.

2. The error measurement method for the machine tool according to claim 1, further comprising
calculating at least one of the disturbance index values based on a plurality of the error values and a window function.

3. The error measurement method for the machine tool according to claim 2, further comprising
calculating at least one of the disturbance index values based on a difference between the one error value and a value obtained by smoothing the plurality of error values by the window function.

4. The error measurement method for the machine tool according to claim 1, wherein
in the determining, when the at least one disturbance index value exceeds the threshold, the installing is performed again on the target or the positioning condition where the error value has already been acquired.

5. The error measurement method for the machine tool according to claim 4, wherein
when a count of performing the installing on the target or the positioning condition exceeds a predetermined count, the installing is not performed again.

6. The error measurement method for the machine tool according to claim 1, wherein
in the determining, when the at least one disturbance index value exceeds the threshold, its situation is notified.

7. An error measurement method for a machine tool for measuring an error in a machine tool, wherein
the machine tool includes two or more translational axes, one or more rotation axes or a translational axis different from the translational axes, a table configured to hold a workpiece, and a spindle head configured to hold a tool, the two or more translational axes enable a relative motion of two degrees or more of translational freedom of the tool held onto the spindle head with respect to the workpiece,
the error measurement method comprising:
installing a target on the table, positioning the two or more translational axes and the rotation axis or the different translational axis under a plurality of conditions, and detecting a position of the target using a sensor mounted to the spindle head to acquire a measured value regarding the position of the target for each of the positioning conditions and to acquire an error value regarding the position of the target based on each of the acquired measured values;
calculating at least one disturbance index value indicative of a degree of disturbance in the measurement for each of the positioning conditions; and
determining whether the disturbance index value exceeds a preliminarily set threshold.

8. A machine tool comprising:
two or more translational axes;
a table configured to hold a workpiece;
a spindle head configured to hold a tool, the translational axes enabling a relative motion of two degrees or more of translational freedom of the tool held onto the spindle head with respect to the workpiece;
an error value acquisition unit configured to detect a position of each target using a sensor mounted to the spindle head in a state where a masterwork having a plurality of the targets is installed on the table to acquire a measured value regarding the position of each of the targets and to acquire an error value regarding the position of each of the targets using each of the acquired measured values and a preliminarily acquired calibration value regarding the position of each of the targets;
a disturbance index value calculation unit configured to calculate at least one disturbance index value indicative of a degree of disturbance in the measurement for each of the targets; and
a threshold determination unit configured to determine whether the disturbance index value exceeds a preliminarily set threshold.

9. A machine tool comprising:
two or more translational axes;
one or more rotation axes or a translational axis different from the translational axes;
a table configured to hold a workpiece;
a spindle head configured to hold a tool, the two or more translational axes enabling a relative motion of two degrees or more of translational freedom of the tool held onto the spindle head with respect to the workpiece;
an error value acquisition unit configured to position the two or more translational axes and the rotation axis or the different translational axis under a plurality of conditions in a state where a target is installed on the table and detect a position of the target using a sensor mounted to the spindle head to acquire a measured value regarding the position of the target for each of the positioning conditions and to acquire an error value regarding the position of the target based on each of the acquired measured values;
a disturbance index value calculation unit configured to calculate at least one disturbance index value indicative of a degree of disturbance in the measurement for each of the positioning conditions; and
a threshold determination unit configured to determine whether the disturbance index value exceeds a preliminarily set threshold.

* * * * *